3,272,459
FLIGHT CONTROL ARRANGEMENT
Gero Madelung and Leonhard Bräuer, Munich, and Benedikt Emmerich, Krailling, Germany, assignors to Messerschmitt AG., Augsburg, Germany
Filed Mar. 10, 1964, Ser. No. 350,799
19 Claims. (Cl. 244—77)

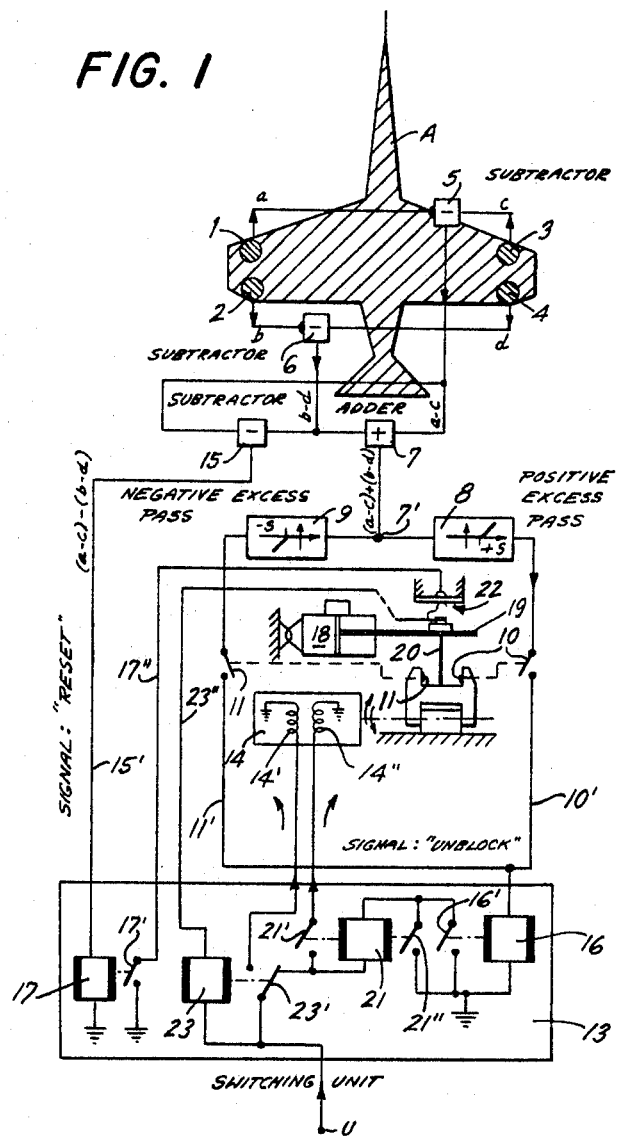

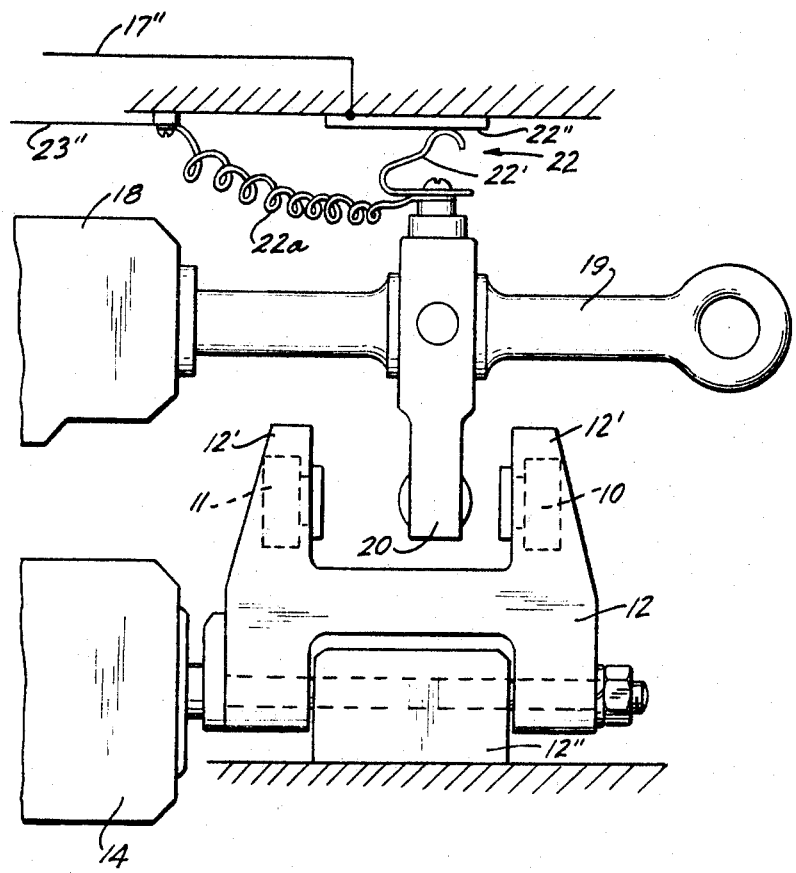

The present invention concerns an arrangement including logical circuit means for changing the regulation range of a flight regulator of an aircraft.

This is a continuation-in-part application based on our copending application Serial No. 237,703, filed November 14, 1962 with the title, "Flight Control Arrangement," now abandoned.

An automatic flight regulator ordinarily has only a limited regulation range within which it regulates the control of the aircraft. In the case of disturbances, malfunctions or failures occurring in the arrangement to be controlled by the regulator, particularly in the propulsion means, the possibility exists that the effect of such disturbances and the like is compensated by supplementing the automatic control by manual control.

However, if a flight regulator would have an unlimited regulation range then an extremely high reliability of the regulating arrangement would be required so that even extremely serious disturbances are reliably corrected, particularly because in such cases the use of a supplemental, manual control would not be possible. The above mentioned extreme reliability of the regulating arrangement would call for multiplying the number of components in the respective arrangements. However, this entails many disadvantages. An increase of the number of the components of the control and regulating arrangement calls for correspondingly additional monitoring and data comparing devices in connection with the various control channels. Also, the service weight and the space required of the arrangement increases considerably as well as the cost of the arrangement and the cost of its maintenance.

Where a flight regulator is used which has a limited regulation range supplemented by an excess range for manual control it is possible that particularly in the case of multi-motor vertically starting and landing airplanes of the so-called VTOL type a considerable rotational acceleration occurs during hovering condition where the rudders are without effect or during the transition to cruising flight where the rudders have only a reduced effect. Since under such conditions the thrust forces of the propulsion means are very high, and since under these circumstances the above mentioned disturbances or failures cannot be corrected manually by the pilot except too late on account of the unavoidable comparatively slow reaction by the pilot, very dangerous flight conditions may develop.

It is therefore one object of this invention to provide for an arrangement for changing whenever required the initially restricted regulation of a flight regulator automatically to a greater regulation range. However, such extended regulation range shall be provided only when an outside disturbance or failure occurs e.g. due to loss of thrust, but not when a malfunction of the regulator itself causes the flight regulator servomotor to assume a position corresponding to a disturbance and reaches the limits of the above mentioned restricted regulation range.

It is another object of the invention to provide for an arrangement as set forth which is entirely reliable and is composed of a comparatively small number of reliable elements.

Other objects of the invention would appear from the following specification.

With above objects in view the invention includes an arrangement for changing the regulation range of a flight regulator of an aircraft having a plurality of propulsion means, comprising, in combination, flight regulator servomotor means having a predetermined maximum range of operational stroke adapted to correspondingly adjust the flight regulator; limiter means for limiting said stroke and changeable between an inoperative condition in which it permits said stroke to extend to said predetermined maximum range, and an operative condition in which it restricts said stroke to a reduced maximum range; monitoring means including a plurality of detector means for deriving electrical control signals representing analog values corresponding to the operational conditions of at least one pair of the propulsion means, respectively, existing at a given moment; and electrical control means responsive to said control signals and cooperating with said limiter means for changing said limiter means from said operative to said inoperative condition when said stroke of said servomotor means reaches said reduced maximum and simultaneously said control signals assume a value exceeding predetermined first limit values, and for returning said limiter means to said inoperative condition when said stroke of said servomotor means reaches said reduced maximum and simultaneously said control signals assume a value exceeding predetermined first limit values, and for returning said limiter means to said operative condition when said control signals assume a second predetermined value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram of a circuit arrangement including logical circuit elements and including certain mechanical control members in diagrammatic form; and FIG. 2 is a diagrammatic elevation of an embodiment of the mechanical control members of FIG. 1.

For the purpose of explanation the following description of an embodiment of the invention refers to a servomotor cooperating with a flight regulator for roll movements of a VTOL type aircraft having four vertical propulsion plants in the wings. However, the description of the invention applies analogously also for similar arrangements concerning the control of movements of the aircraft about the other axes thereof.

As illustrated by FIG. 1, an aircraft A is equipped with four propulsion plants 1, 2, 3, 4 each being associated with detector means for monitoring the operational condition of the particular propulsion plant, e.g., its thrust or energy output. These detector means furnish electrical control signals representing analog values corresponding to the operational conditions of the respectively associated propulsion plant. The control signals derived by the detector means from the individual propulsion plants 1–4 are indicated as $a$, $b$, $c$ and $d$. In this particular example the propulsion plants 1 and 3 located at opposite sides of the aircraft axis are considered as a first pair and so are the associated detector means, and similarly the propulsion plants 2 and 4 and the associated detector means are considered as a second pair. The monitoring arrangement according to the invention includes a first subtractor circuit or device 5 connected to form from the control signals $a$ and $c$ a first secondary control signal representing the difference $(a-c)$, and a second subtractor circuit or device 6 connected to form a second secondary control signal representing a second difference $(b-d)$. There is further provided an adder circuit or device 7 connected with the devices 5 and 6 so as to form a third secondary control signal representing the sum $(a-c)+(b-d)$. When this sum is not zero, the thrusts of the propulsion plants are not in equilibrium, and an automatic adjustment relative to the roll axis is desired. If the third secondary control signal $(a+b)-(c+d)$ or $(a-c)+(b-d)$ exceeds a positive limit value $+S'$ or drops below a negative limit value, the normal range of adjustment of a flight regulator (not shown) is increased in accordance with the invention.

FIG. 1 illustrates diagrammatically a hydraulic servomotor 18 which operates by means of a longitudinally movable rod 19 a conventional flight regulator, not shown. The rod 19 has a portion or lateral extension 20 which cooperates with a limiter device 12. The purpose of the electrical control arrangement according to the invention is to control this limiter device 12 and to change thereby the maximum stroke of the rod 19 and consequently the regulation range of the flight regulator. The flight regulator does not form a part of this invention and may be of conventional type as for instance, described in "Adaptive Control Systems," McGraw-Hill, Electrical and Electronical Engineering Series.

Before proceeding with a description of the circuitry according to FIG. 1, the details of an embodiment of the limiter device will be described now in reference to FIG. 2.

FIG. 2 shows a portion of the servomotor 18 and the rod 19. The latter is provided with a lateral arm 20 which travels along a predetermined path when the rod 19 moves in its longitudinal direction to the right or to the left as seen in FIG. 2. In this example the limiter device mainly consists of a forked stop member 12 tiltably supported in a bearing 12″ for being tilted from the shown position to an inoperative position upon application of a torque by a torque producing device 14 which may be constructed like an electromotor constructed to operate in two opposite directions between angular limit positions. The member 12 has two arms 12′ which in the shown position of member 12 extend across the path of the arm 20. Consequently the longitudinal movement or stroke of the rod 19 is limited to a maximum which is reached whenever the arm 20 engages the inner face of one or the other of the arms 12′. However, when the device 14 is energized in one sense the member 12 is tilted so that the arms 12′ are moved out of the path of the arm 20 so that now the stroke of the rod 19 is no more restricted to a maximum length determined by the spacing between the arms 12′ but is free to extend to its maximum determined either by the inner construction of the servomotor 18 or by the maximum adjustability of the flight regulator. When it is desired to again restrict the stroke of the rod 19 to the limited amount determined by the spacing between the arms 12′ then the device 14 is energized in the opposite sense and will tilt the member 12 from its inoperative position back to the illustrated operative position.

For the purpose of cooperation of the limiter device 12 with the electric control means of FIG. 1, the arms 12′ carry limit switches 10 and 11, respectively, which are normally in open position and are actuated whenever the arm 20 engages one or the other of the limit switches 10 and 11.

In addition, in a practical embodiment the member 19 carries a sliding contact 22′ which cooperates with a contact bar 22″ mounted stationarily and extending parallel with the direction of movement of rod 19. The contact 22′ is connected by a flexible conductor 22a with a lead 23″ described further below, while contact 22″ is connected to a lead 17″ also referred to below. The length of the contact bar 22″ is so dimensioned that it can be engaged by the sliding contact 22′ only as long as the arm 20 is in a medium position within the length of the normal limited stroke of the rod 19 so that, if the contacts 22′ and 22″ are in engagement, the member 12 can be tilted back from its inoperative position into the illustrated operative position and then the arm 20 will be positioned again between the arms 12′.

Returning now to the description of FIG. 1, it can be seen that the output of the adder device 7 furnishing the above mentioned third secondary control signal is taken to a junction point 7′ which is connected with two devices 8 and 9, respectively. These devices include amplitude responsive switches of generally known type of which the device 8 permits the passage of said third secondary control signal only when it is positive and exceeds a predetermined positive limit value $+S$, while the device 9 permits the passage of said third secondary control signal only when it is negative and exceeds a negative limit value $-S$. Thus the device 8 may be called a positive excess pass and the device 9 may be called a negative excess pass. The device 8 is connected via line 10′ containing the above mentioned limit switch 10 with a switching unit 13 in a similar manner the device 9 is connected by line 11′ containing the other limit switch 11 with the same switching unit 13. It is therefore clear that the above mentioned third secondary control signal representing the sum $(a-c)+(b-d)$ can reach the switching unit 13 only when said secondary control signal exceeds either the limit value $+S$ or the limit value $-S$ at the moment when during the movements of the rod 19 of the servomotor 18 the engagement of the portion 20 with one or the other of the limit switches 10 and 11 causes closing of one of the latter.

When this occurs, extension of the stroke of the rod 19 beyond the reduced range thereof determined by the spacing between the arms 12′ is possible. Consequently, the torque producing device 14 can be energized in such a sense that it tilts the limiter member 12 from its operative position to its inoperative position. This is effected by the application of the above mentioned third secondary control signal to the switching unit 13 which controls the torque producing device 14.

The switching unit 13 may contain one group of relays responding to application of said third secondary control signal and causing thereupon the member 12 to be tilted to its inoperative position by corresponding action of the device 14, and another group of relays responding to a "resetting control signal" (as described below) and thereupon causing the member 12 to return to its operative position by corresponding inverse action of the device 14.

For instance, the unit 13 may contain a first relay having a coil 16 connected between ground and the lines 10′, 11′ mentioned above and closing, when energized by said third secondary control signal, its normally open contact 16′. The closing of contact 16′ completes a circuit between a source of energy U and ground across a second relay coil 21 and a relay contact 23′ provided the latter is in its normal position as illustrated. Energization of relay coil 21 results in closing of its normally open contacts 21′ and 21″ with the effect that the coil holds itself energized via contact 21″ at least as long as contact 23′ remains in its illustrated position, no matter how brief the third secondary signal may be. In addition, the closed contact 21′ transmits energy from source U to a coil 14″ of the device 14 which thereupon turns the member 12 from its illustrated operative position to its inoperative position whereby the limitation of the stroke of rod 19 by the arms 12′ is eliminated. Member 12 remains in its inoperative position because coil 14″ remains energized; however, if desired a limit switch (not shown) is actuated by member 12 when reaching its inoperative limit position whereby energization of coil 14″ is terminated.

If after tilting the member 12 to its inoperative position the amplitude of the third secondary control signal as a result of the action of the flight regulator drops below the limit value $+S$ or $-S$, as the case may be, the third secondary control signal is no longer applied to the switching unit 13 and the tiltable limiter member 12 will remain in its idle position.

It is desired that the tiltable member 12 is returned to its operative position only when the difference $(a-c)-(b-d)$ drops below a predetermined value $x$. The value $x$ depends upon the tolerances or measuring accuracy of the arrangement. For this purpose a further subtractor circuit or device 15 is connected between the subtractor devices 5 and 6 and is connected via a line 15' in parallel with the above described circuit with a second input of the switching unit 13. Whenever the just mentioned condition exists, a resetting control signal is applied by the device 15 to the switching unit 13 which contains a further relay with a coil 17 energized upon the application of the resetting control signal.

The relay coil 17 when energized closes its normally open contact 17' whereby energization of relay coil 23 by current from source U is caused provided that the contacts 22', 22" of safety contact arrangement 22 are in engagement as illustrated. Energization of coil 23 results in moving its contacts 23' to its second position whereby transmission of energy from source U to the other coil 14' of the device 14 is initiated whereby the member 12 is rotated in reverse direction and returned to its operative position as illustrated. However, it will be understood that such resetting motion of member 12 is only possible when the arm 20, i.e., the rod 19 is in such a position that after return of member 12 to normal position the arm 20 will be located between the arms 12'. This is assured because the circuit between contact 17' and relay coil 23 via lines 17" and 23" is conductive only when the contact arrangement 22 is conductive, and this is only possible when contacts 22', 22" are in engagement, i.e., when rod 19 with arm 20 is in proper position longitudinally.

Preferably the relay 16 is a normally unenergized relay while the relay 17 is a normally energized relay. The range of automatic adjustment can be only extended if either switch 10 or switch 11 is closed in the stroke end positions of member 19 and at the same time the detector elements respond to a corresponding major disturbance in the equilibrium of the thrust forces. A displacement of members 19, 20 beyond the normal range, which may be caused by a malfunction of the flight regulator, is not possible since it is prevented by member 12, unless the thrust equilibrium is disturbed to such an extent that manual adjustment is no longer possible or feasible.

It will be understood that if the aircraft has only two propulsion plants or if only the operational conditions of two of the existing propulsion plants are to be monitored, the adder device 7 may be omitted. It should be further understood that if more than the above described four propulsion plants and associated detector means are to be comprised in the arrangement, then a plurality of pairs of detector devices may be connected in parallel with each other.

It should be noted that the above mentioned detector devices may also be arranged and constructed to respond to an acceleration caused by an excessive or undesirable difference between the thrusts of the propulsion plants.

It will be understood that each of the elements described above, or two or more together, may also find a useful application in other types of an arrangement for changing the regulation range of a flight regulator of an aircraft differing from the types described above.

While the invention has been illustrated and described as embodied in an arrangement for changing the regulation range of a flight regulator of an aircraft having a plurality of propulsion means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for changing the regulation range of a flight regulator of an aircraft having a plurality of propulsion means, comprising, in combination, flight regulator servomotor means having a predetermined maximum range of operational stroke adapted to correspondingly adjust the flight regulator; limiter means for limiting said stroke and changeable between an inoperative condition in which it permits said stroke to extend to said predetermined maximum range, and an operative condition in which it restricts said stroke to a reduced maximum range; monitoring means including a plurality of detector means for deriving electrical control signals representing analog values corresponding to conditions of at least one pair of the propulsion means, respectively, existing at a given moment; and electrical control means responsive to said control signals and cooperating with said limiter means for changing said limiter means from said operative to said inoperative condition when said stroke of said servomotor means reaches said reduced maximum and simultaneously said control signals assume a value exceeding predetermined first limit values, and for returning said limiter means to said operative condition when said control signals assume a second predetermined value.

2. An arrangement for changing the regulation range of a flight regulator of an aircraft having a plurality of propulsion means, comprising, in combination, flight regulator servomotor means having a predetermined maximum range of operational stroke adapted to correspondingly adjust the flight regulator; limiter means engageable by a portion of said servomotor means for limiting upon such engagement said stroke and movable between an inoperative position in which it permits said stroke to extend to said predetermined maximum range, and an operative position in which it restricts said stroke to a reduced maximum range; monitoring means including a plurality of detector means for deriving electrical control signals representing analog values corresponding to the operational conditions of at least one pair of the propulsion means, respectively, existing at a given moment; and electrical control means responsive to said control signals and cooperating with said limiter means for moving said limiter means from said operative to said inoperative position when said stroke of said servomotor means by said engagement with said limiter means reaches said reduced maximum and simultaneously said control signals assume a value exceeding predetermined first limit values, and for returning said limiter means to said operative condition when said control signals assume a second predetermined value.

3. An arrangement for changing the regulation range of a flight regulator of an aircraft having a plurality of propulsion means, comprising, in combination, flight regulator servomotor means having a predetermined maximum range of operational stroke adapted to correspondingly adjust the flight regulator; limiter means engageable by a portion of said servomotor means for limiting upon such engagement said stroke and movable between an inoperative position in which it permits said stroke to extend to said predetermined maximum range, and an operative position in which it restricts said stroke to a reduced maximum range; monitoring means including a plurality of detector means for deriving electrical control signals representing analog values corresponding to the operational conditions of at least one pair of the propulsion means, respectively, existing at a given moment, said monitoring means including subtractor means for furnishing secondary control signals representing the difference between at least two of said analog values; and electrical control means responsive to said secondary control signals and cooperating with said limiter means for moving said limiter means from said operative to said inoperative position when said stroke of said servomotor means by said engagement with said limiter means reaches said reduced maximum and simultaneously said secondary control signals assume a value exceeding predetermined first limit values, and for returning said limiter means to said operative condition when said secondary control signals assume a second predetermined value, said control means including first and second amplitude responsive switch means permitting passage of said secondary control signals only when they assume a value exceeding a positive and negative limit value, respectively, and electromechanical means responsive to said secondary control signals passed by either one of said amplitude responsive switch means for moving, when energized thereby, said limiter means from said operative to said inoperative position.

4. An arrangement for changing the regulation range of a flight regulator of an aircraft having a plurality of propulsion means, comprising, in combination, flight regulator servomotor means having a predetermined maximum range of operational stroke adapted to correspondingly adjust the flight regulator; limiter means engageable by a portion of said servomotor means for limiting upon such engagement said stroke and movable between an inoperative position in which it permits said stroke to extend to said predetermined maximum range, and an operative position in which it restricts said stroke to a reduced maximum range; monitoring means including a plurality of detector means for deriving electrical control signals representing analog values corresponding to the operational conditions of at least one pair of the propulsion means, respectively, existing at a given moment, said monitoring means including a plurality of subtractor means connected with a plurality of pairs of said detector means for furnishing secondary control signals representing the difference between different pairs of said analog values, and adder means for adding said secondary control signals furnished by said plurality of subtractor means and furnishing second secondary control signals representing the sum of the respective differences between said different pairs of said analog values; and electrical control means responsive to said second secondary signals and cooperating with said limiter means for moving said limiter means from said operative to said inoperative position when said stroke of said servomotor means by said engagement with said limiter means reaches said reduced maximum and simultaneously said second secondary control signals assume a value exceeding predetermined first limit values, and for returning said limiter means to said operative condition when said second secondary control signals assume a second predetermined value, said control means including first and second amplitude responsive switch means permitting passage of said secondary control signals only when they assume a value exceeding a positive and negative limit value, respectively, and electromechanical means responsive to said secondary control signals passed by either one of said amplitude responsive switch means for moving, when energized thereby, said limiter means from said operative to said inoperative position.

5. An arrangement according to claim 3, wherein said limiter means include limit switch means arranged to be actuated when said limiter means is engaged by said portion of said servomotor means, and connected in circuit with said amplitude responsive switch means and said electromechanical means for permitting energization of the latter by said secondary control signals only when said limit switch means are actuated.

6. An arrangement according to claim 4, wherein said limiter means include limit switch means arranged to be actuated when said limiter means is engaged by said portion of said servomotor means, and connected in circuit with said amplitude responsive switch means and said electromechanical means for permitting energization of the latter by said second secondary control signals only when said limit switch means are actuated.

7. An arrangement according to claim 4, wherein said monitoring means further include second subtractor means for furnishing resetting control signals representing the difference of the respective differences between said different pairs of said analog values, and wherein said electrical control means include second electromechanical means responsive to said resetting control signals for moving, when energized thereby, said limiter means from said inoperative position to said operative position.

8. An arrangement according to claim 2, wherein said electrical control means include moving means energizable by an outside source of energy and moving, when energized in a first sense, said limiter means from said operative position to said inoperative position, and moving, when energized in the opposite sense, said limiter means from said inoperative position to said operative position, and switching means responsive to said control signals and causing, when actuated by said control signals, energization of said moving means in said first or said opposite sense depending on the characteristics of said control signals applied thereto.

9. An arrangement according to claim 3, wherein said electrical control means include moving means energizable by an outside source of energy and moving, when energized in a first sense, said limiter means from said operative position to said inoperative position, and moving, when energized in the opposite sense, said limiter means from said inoperative position to said operative position, and switching means responsive to said secondary control signals and causing, when acuated by said secondary control signals, energization of said moving means in said first or said opposite sense depending on the characteristics of said secondary control signals applied thereto.

10. An arrangement according to claim 4, wherein said electrical control means include moving means energizable by an outside source of energy and moving, when energized in a first sense, said limiter means from said operative position to said inoperative position, and moving, when energized in the opposite sense, said limiter means from said inoperative position to said operative position, and switching means responsive to said second secondary control signals and causing, when actuated by said second secondary control signals, energization of said moving means in said first or said opposite sense depending on the characteristics of said second secondary control signals applied thereto.

11. An arrangement according to claim 10, wherein said switching means include first switching means responsive to said control signals and causing, when actuated by said control signals, energization of said moving means in said first sense, and second switching means responsive to said resetting control signals and causing, when actuated by said resetting control signals, energization of said moving means in said opposite sense.

12. An arrangement according to claim 8, wherein said limiter means include a stop member turnable between said operative and inoperative positions, said moving means being electrical torque producing means operable in opposite torque directions depending upon the manner of its energization, and said switching means being relay means energizable by said control signals and controlling the energization of said torque producing means.

13. An arrangement according to claim 9, wherein said limiter means include a stop member turntable between said operative and inoperative positions, said moving means being electrical torque producing means operable in opposite torque directions depending upon the manner of its energization, and said switching means being relay means energizable by said secondary control signals and controlling the energization of said torque producing means.

14. An arrangement according to claim 10, wherein said limiter means include a stop member turnable between said operative and inoperative positions, said moving means being electrical torque producing means operable in opposite torque directions depending upon the manner of its energization, and said switching means being relay means energizable by said second secondary control signals and controlling the energization of said torque producing means.

15. An arrangement according to claim 11, wherein said limiter means include a stop member turnable between said operative and inoperative positions, said moving means being electrical torque producing means operable in opposite torque directions depending upon the manner of its energization, and said first switching means being first relay means energizable by said second secondary control signals and controlling the energization of said torque producing means in said first sense, and said second switching means being second relay means energizable by said resetting control signals and controlling the energization of said torque producing means in said opposite sense.

16. An arrangement according to claim 15, wherein said first relay means are of the normally unenergized type and said second relay means are of the normally energized type.

17. An arrangement for controlling the flight regulator of a VTOL aircraft having a plurality of jet propulsion means, comprising in combination, flight regulator operating means; limiter means for normally limiting the range of regulation of said operating means to a normal range; detector means cooperating with said propulsion means to produce an electrical control signal at an operational condition of said propulsion means requiring regulation of said operating means beyond said normal range; and control means controlled by said control signal for inactivating said limiter means so that the range of regulation of said operating means is increased.

18. An arrangement for controlling the flight regulator of an aircraft having a plurality of propulsion means, comprising in combination, flight regulator operating means; limiter means for normally limiting the range of regulation of said operating means to a normal range, said limiter means including a pair of limit switches adapted to be actuated when said operating means is in either of two conditions corresponding to the limits of said normal range; detector means cooperating with said propulsion means to produce an electrical control signal for representing an operational condition of said propulsion means; and a control means controlled by said control signal for inactivating said limiter means so that the range of regulation of said operating means is increased, said control means including an electric circuit connected to said limit switches so that said limiter means is inacticated only when said operating means has reached the limits of its normal range of regulation.

19. An arrangement for controlling the flight regulator of an aircraft having a pair of propulsion means located on opposite sides of the aircraft for producing thrusts which are normally substantially equal to each other comprising in combination, flight regulator operating means; limiter means for normally limiting the range of regulation of said operating means to a normal range; detector means cooperating with said propulsion means to produce an electrical control signal when said thrusts of said propulsion means are different from each other to a selected extent; and control means controlled by said control signal for inactivating said limiter means so that the range of regulation of said operating means is increased when the equilibrium of said thrusts is disturbed to said selected extent.

References Cited by the Examiner
UNITED STATES PATENTS
2,632,516  3/1953  Longfellow _____ 170—160.2

FERGUS S. MIDDLETON, *Primary Examiner.*